US010645043B2

(12) United States Patent
Davis

(10) Patent No.: US 10,645,043 B2
(45) Date of Patent: May 5, 2020

(54) STATEFUL NOTIFICATION

(71) Applicant: Lenovo (Singapore) Pte. Ltd., Singapore (SG)

(72) Inventor: Mark Charles Davis, Durham, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 1500 days.

(21) Appl. No.: 14/311,802

(22) Filed: Jun. 23, 2014

(65) Prior Publication Data

US 2015/0372953 A1    Dec. 24, 2015

(51) Int. Cl.
*H04L 12/58* (2006.01)
*H04W 4/12* (2009.01)
*H04M 3/436* (2006.01)

(52) U.S. Cl.
CPC ............ *H04L 51/12* (2013.01); *H04M 3/436* (2013.01); *H04W 4/12* (2013.01)

(58) Field of Classification Search
CPC .......... H04L 51/12; H04M 3/436; H04W 4/12
See application file for complete search history.

(56) References Cited

U.S. PATENT DOCUMENTS

| | | | | |
|---|---|---|---|---|
| 2005/0036511 A1* | 2/2005 | Baratakke | ............... | H04L 29/06 370/469 |
| 2006/0153176 A1* | 7/2006 | Caswell | ............. | H04M 7/1295 370/356 |
| 2009/0299788 A1* | 12/2009 | Huber | ................ | G06Q 20/1235 455/456.3 |
| 2011/0258454 A1* | 10/2011 | Qiu | ......................... | H04L 63/10 713/176 |
| 2013/0097660 A1* | 4/2013 | Das | ........................ | H04L 63/10 726/1 |

FOREIGN PATENT DOCUMENTS

| CN | 102238273 A | 11/2011 |
|---|---|---|
| CN | 103019719 A | 4/2013 |
| CN | 103262494 A | 8/2013 |
| CN | 103873348 A | 6/2014 |

OTHER PUBLICATIONS

Office Action issued by the SIPO dated Dec. 4, 2017 regarding the Chinese patent application No. 201510176765.5 (8 pages).

* cited by examiner

*Primary Examiner* — Qun Shen
(74) *Attorney, Agent, or Firm* — Brian J. Pangrle

(57) ABSTRACT

An apparatus can include a processor; memory operatively coupled to the processor wherein the memory stores identifier information; a network interface; notification circuitry; and policy engine circuitry that, responsive to receipt of identifier information via the network interface, activates the notification circuitry if, according to a match criterion, a match exists between at least a portion of the received identifier information and at least a portion of identifier information previously transmitted via the network interface and stored in the memory.

20 Claims, 8 Drawing Sheets

US 10,645,043 B2

STATEFUL NOTIFICATION

TECHNICAL FIELD

Subject matter disclosed herein generally relates to communication of information.

BACKGROUND

People use communication devices for various types of applications, which may include digital cellular network communications, Internet communications and other types of communications. A communication device may receive a signal that causes the communication device to issue a notification. Such notifications may be distracting, result in charges, etc.

SUMMARY

An apparatus can include a processor; memory operatively coupled to the processor wherein the memory stores identifier information; a network interface; notification circuitry; and policy engine circuitry that, responsive to receipt of identifier information via the network interface, activates the notification circuitry if, according to a match criterion, a match exists between at least a portion of the received identifier information and at least a portion of identifier information previously transmitted via the network interface and stored in the memory. Various other methods, apparatuses, systems, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

Figure 1:
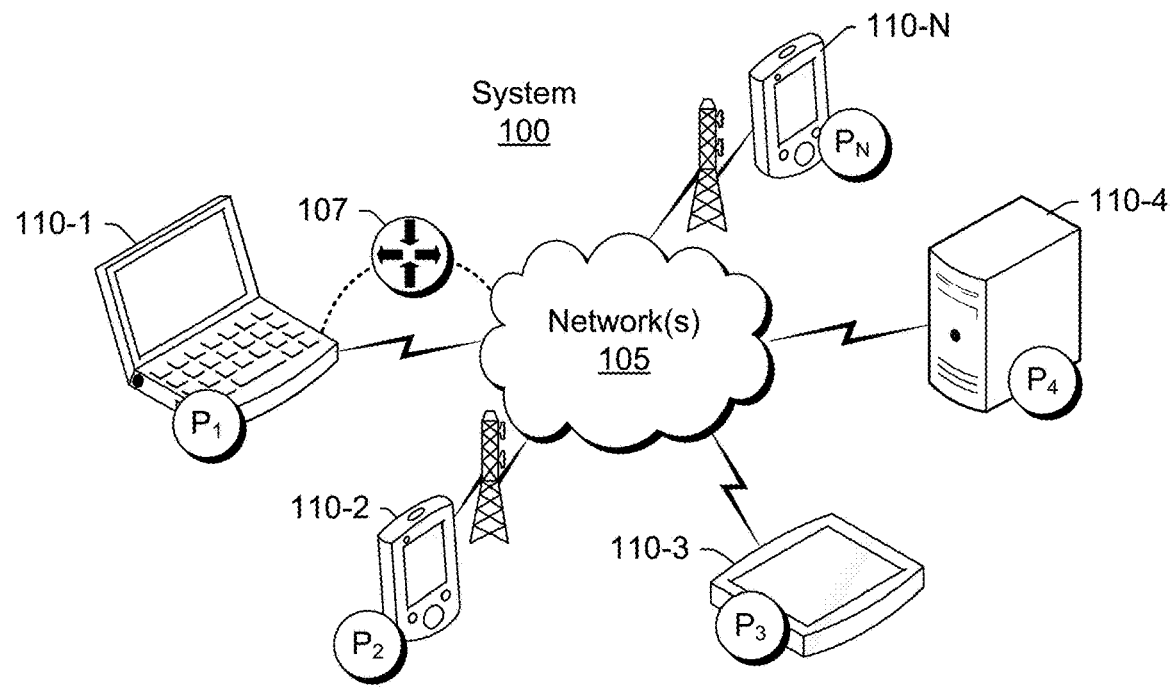
FIG. 1 is a diagram of an example of a system and an example of a device.
Figure 1:
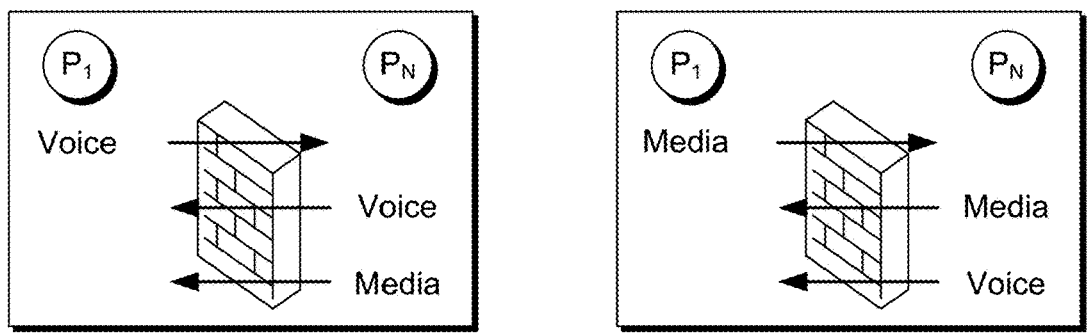
Figure 1:
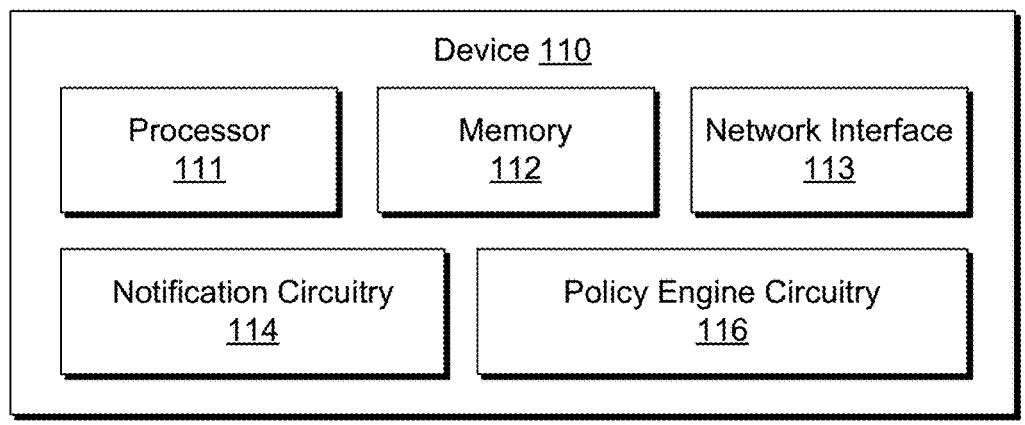

The following description includes the best mode presently contemplated for practicing the described implementations. This description is not to be taken in a limiting sense, but rather is made merely for the purpose of describing general principles of various implementations. The scope of invention should be ascertained with reference to issued claims.

As an example, a user of a communication device may desire not to be disturbed in instances where the communication device receives communication signals. As an example, a firewall may be implemented that operates in a stateful manner, for example, to determine whether a particular communication signal results in issuance of a notification to a user of a communication device. Such a firewall may act to prevent unauthorized traffic from triggering a notification, from resulting in a billing event, etc. For example, digital cellular network traffic may be charged to a user account where a signal reaches a communication device associated with the user account and/or where such a signal upon receipt causes the communication device to issue a notification. In such an example, the signal may be associated with voice or, for example, media. As to media, media may include one or more of text media, image media, and video media. For example, consider a text message such as a SMS, an image message such as a photo taken by camera circuitry of a communication device, or a video message such as a video taken by camera circuitry of a communication device.

As an example, a firewall may be stateful and operate to control notifications. In such an example, the firewall may include one or more policies that can be implemented, for example, via user input, via automatic processing of one or more types of communications, etc. As an example, a policy engine may implement one or more policies where such policies may operate according to one or more rules. As an example, a policy engine may be configured to compare information associated with a communication to information stored in memory, which may be memory of a communication device. In such an example, where a comparison indicates that a match exists, a policy engine may implement a policy based at least in part on the match.

As an example, a policy may be "if I called user Y, then it is OK for user Y to call me". In such an example, where user X calls user Y, identifier information associated with user Y may be stored in a data store such as memory of a communication device of user X and where the communication device of user X receives a communication signal initiated by user Y (e.g., a communication device of user Y), a policy engine may access the memory and compare information in the communication signal to information in the memory and then decide if a match exists for at least a portion of the information. In such an example, where a match exists, the policy engine may activate notification circuitry of the communication device of user X; otherwise, the policy engine may dismiss the communication signal, optionally prompting the communication device of user X to enter the identifier information of user Y into a blacklist. As an example, such a blacklist may be stored locally and/or remotely. For example, on a periodic basis the blacklist may be transmitted "upstream" in a network system such that blocking occurs remote from a communication device of a user. While a blacklist is mentioned, a policy engine may additionally and/or alternatively maintain a whitelist, which may be stored locally and/or remotely, optionally being transmitted "upstream".

As an example, an apparatus can include a processor; memory operatively coupled to the processor wherein the memory stores identifier information; a network interface; notification circuitry; and policy engine circuitry that, responsive to receipt of identifier information via the network interface, activates the notification circuitry if, according to a match criterion, a match exists between at least a portion of the received identifier information and at least a portion of identifier information previously transmitted via the network interface and stored in the memory.

As an example, a method can include storing a whitelist of identifier information in memory; receiving identifier information via a network interface; comparing at least a portion of the received identifier information to at least a portion of the stored whitelist of identifier information; based at least in part on the comparing, determining if a match exists according to at least one match criterion; and if a match does exist, issuing a notification; or if a match does not exist, issuing a prompt for storing at least a portion of the received identifier information to a blacklist in memory.

As an example, one or more machine-readable storage media can include processor-executable instructions executable to instruct an information handling machine to: store a whitelist of identifier information in memory; receive identifier information via a network interface; compare at least a portion of the received identifier information to at least a portion of the stored whitelist of identifier information; based at least in part on the comparison, determine if a match exists according to at least one match criterion; and if a match does exist, issue a notification; or if a match does not exist, issue a prompt to store at least a portion of the received identifier information to a blacklist in memory.

As mentioned, a policy may specify rules that can identify traffic that is permitted or denied. Such rules may optionally be enhanced, for example, by remembering certain previous transactions. While various examples mention communications with respect to digital cellular networks, a signal may be associated with a different type of wireless network such as, for example, a wireless network that allows an electronic device to exchange data or connect to the Internet (e.g., consider a WiFi network). As an example, voice signals may be transmitted via a digital cellular network, media signals may be transmitted via a digital cellular network, etc. As an example, voice signals may be transmitted via the Internet, media signals may be transmitted via the Internet, etc. As an example, signals transmitted via a digital cellular network may include signals associated with an Internet application such as a social media application (e.g., Twitter® application, Facebook® application, LinkedIn® application, QQ® application, etc.). As to identifier information, such information may be associated with an identity of a user that has an account with one or more entities, which may provide services for communications via one or more of digital cellular networks, the Internet, etc.

As an example, a device may be a smart phone that may be configured for communications via a digital cellular network and optionally via the Internet. As an example, such a device may implement at least in part a policy engine that may provide for stateful operations. As an example, consider a stateful firewall that can control notifications, for example, to implement a stateful notification scheme. In such an example, identifier information may include emails, address book entries, time of day, etc. As to statefulness, such information may optionally be coupled to one or more policies that depend on outgoing transmissions of a device and optionally other information such as time of a transmission, time of a transmission with respect to a present time, number of transmission, number of transmissions to a particular identity, etc. Thus, a policy engine may maintain "states" that may be particular to identities based at least in part on transmissions and other rules, information, etc. As an example, a policy engine may police one or more types of traffic such as, for example, one or more of TCP/IP traffic, telephone voice traffic, SMS traffic, MMS traffic, Bluetooth® connection traffic, email traffic, social network application traffic, etc.

As an example, an address book that includes entries may be used by a policy engine to implement one or more policy protocols. In such an example, past activities may be used to set policy for such protocols. As an example, past activity may be translated into one or more policy states.

As an example, a policy may be, after calling a number, allow incoming phone calls, SMS and MMS even if not in an address book. As an example, a policy may be allow an incoming call only after a device has called a number twice (e.g., or n times). As an example, a policy may be to allow SMS from any number a device has sent an SMS to. As an example, a policy may be to allow SMS only if a device has allowed SMS from that sender in the last X minutes (e.g., 10 minutes, 30 minutes, 1 hour, 1 day, 1 week, etc.). As an example, a policy may be to allow an incoming QQ® message only if a device has sent a message to that QQ® user. As an example, a policy may be to allow incoming email from anybody a device has sent email to.

As to QQ, a message may be in a particular originating language that may optionally be translated to another language (e.g., via machine translation). As an example, consider Mandarin to English and English to Mandarin (e.g., cross-cultural communications). QQ can allow for chat and video calls and, for example, an interface to access the Qzone social network. As an example, a client module may be installed on a user's device for interactions with a system such as, for example, the QQ system. For example, a client module may be configured for execution via an operating system of a device such that a user of the device may send and/or receive one or more of a text, image, video, and audio media. As an example, for QQ, accounts include numbers with, for example, from about 5 digits to about 12 digits, where the first QQ number is held by Ma Huateng (account number is 10001).

As an example, a QQ account may be associated with a name, a phone number and/or other identifier information. Thus, a policy may be to allow an incoming QQ message only if a device has sent a transmission to that QQ user (e.g., an account, a device thereof, etc.) where, for example, such a determination may be made via one or more associations that link a QQ account number to other identifier information. For example, where a transmission has been made to a phone number and where a QQ message is received, a method may include attempting to associate an account number of the QQ message with the phone number to make a policy decision as to issuing or not issuing a notification (e.g., or making one or more other decisions).

As an example, a policy may include one or more rules as to a language of a transmission where a method may ascertain a language of a transmission to allow for application of such a policy (e.g., consider a language detection module executable on a user's device). As an example, a user may set a policy to allow for notifications for one or more languages and to block notifications for one or more other languages. Such a policy may be implemented when a user is traveling in a foreign country to block notifications in a language of that foreign country (e.g., undesired solicitations, etc.) while allowing for notifications where a language of a transmission corresponds to a language of the user's home country. As an example, a device may automatically detect location and implement a policy that may be location-based (e.g., home country, foreign country, languages of location, etc.).

As an example, actions associated with a policy or policies may include allow, deny or prompt. For example, on "prompt", a notification or pop-up may be presented on a user interface of a device, for example, to receive input from a user of the device. As an example, a user may temporarily override a policy (e.g., consider an "allow one time" button) or amend a policy (e.g., consider an "allow always" button).

FIG. 1 shows an example of a system 100 that includes one or more networks 105 and optionally one or more types of network equipment 107. As shown, various devices 110-1, 110-2, 110-3, 110-4 to 110-N may operatively couple to the network, for example, via wire and/or wirelessly. As an example, the various devices 110 may include a processor 111, memory 112, a network interface 113, notification circuitry 114 and policy engine circuitry 116. As an example, a device may include multiple processors, multiple network interfaces, etc.

As shown in FIG. 1, the device 110-1 is associated with $P_1$, the device 110-2 is associated with $P_2$, the device 110-3 is associated with $P_3$, the device 110-4 is associated with $P_4$ and the device 110-N is associated with $P_N$. $P_1$ to $P_N$ may be people such as users of the respective devices. For example, $P_1$ to $P_N$ may be associated with one or more user accounts that may be for digital cellular network use, Internet use, etc. As an example, $P_1$ to $P_N$ may be identified by identifier information, which may be a set of identifier information. For example, consider $P_2$ as having a name, a phone number, an email, a user name for a social network application, etc. Such information may be a set of identifier information. Given such a set, an algorithm may associate the information such that one piece of information can retrieve or access the entire set of information. For example, consider a relational database that includes the information or other type of data structures, algorithms, etc. that can associate the information (e.g., object database, etc.).

In the example of FIG. 1, at least one the devices 110-1 to 110-N may include the processor 111; the memory 112 operatively coupled to the processor 111 where the memory 112 stores identifier information; the network interface 113; the notification circuitry 114; and the policy engine circuitry 116 where, for example, the policy engine circuitry 116, responsive to receipt of identifier information via the network interface 113, activates the notification circuitry 114 if, according to a match criterion, a match exists between at least a portion of the received identifier information and at least a portion of identifier information previously transmitted via the network interface 113 and stored in the memory 112.

As illustrated in FIG. 1, where $P_1$ uses the device 110-1 to place a voice call or sends media to $P_N$, where the voice call or media is routed to the device 110-N of $P_N$ via the network 105 (e.g., optionally via the equipment 107), the memory 112 may store identifier information associated with $P_N$. In such an example, the memory 112 may also store information as to a type of communication (e.g., voice, text, image, video, etc.). In turn, where $P_N$ uses the device 110-N to place a voice call or send media to $P_1$, the policy engine circuitry 116 of the device 110-1 of $P_1$ may act to implement a stateful firewall that allows the voice call or media to, responsive to its receipt, activate the notification circuitry 114 of the device 110-1. As an example, notification circuitry may include one or more of a mechanical notifier (e.g., vibrator, buzzer, etc.), an audio notifier (e.g., speaker, etc.), and a visual notifier (e.g., a display, etc.).

Figure 2:
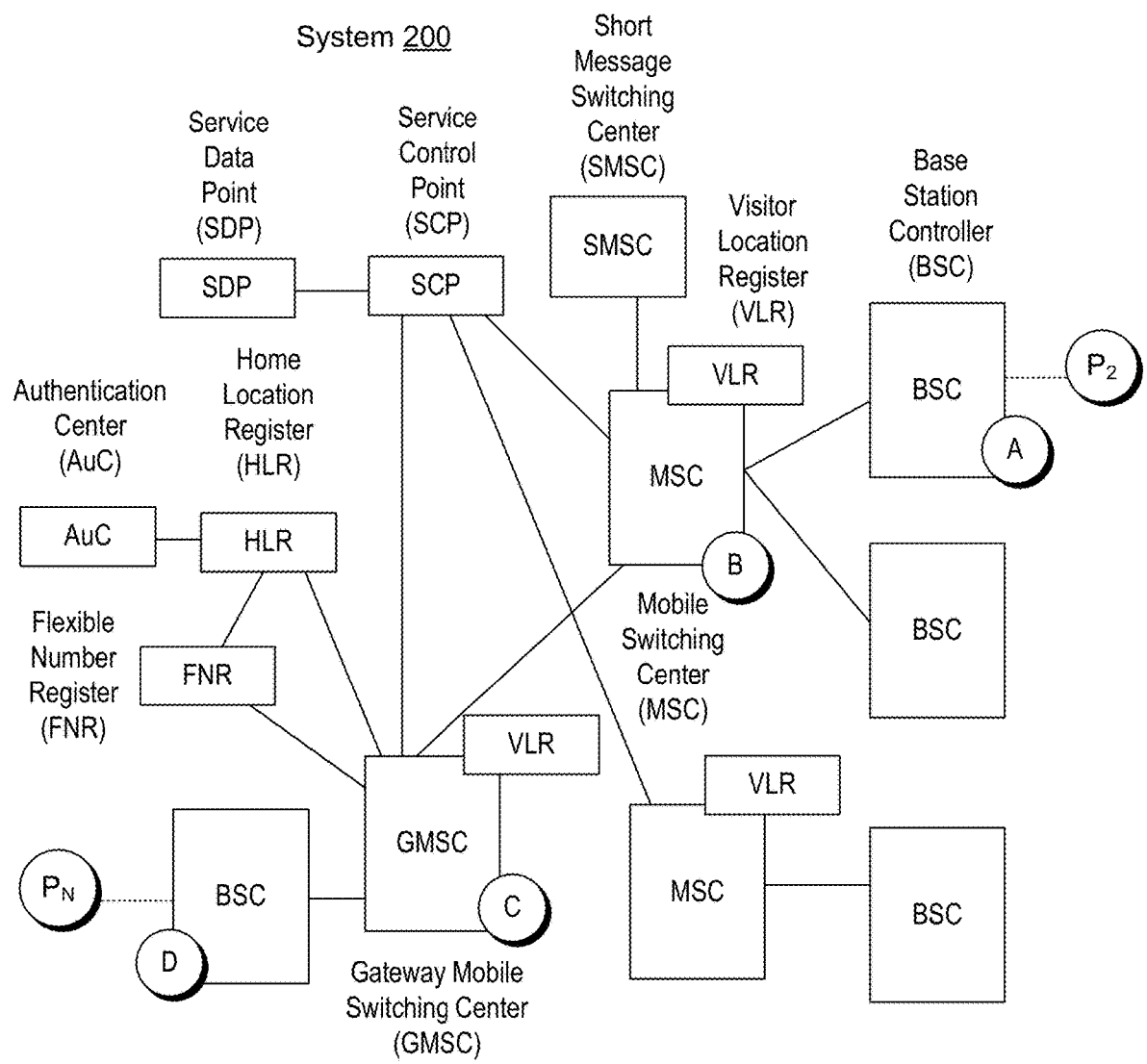
FIG. 2 is a diagram of an example of a system and an example of a method.
Figure 2:
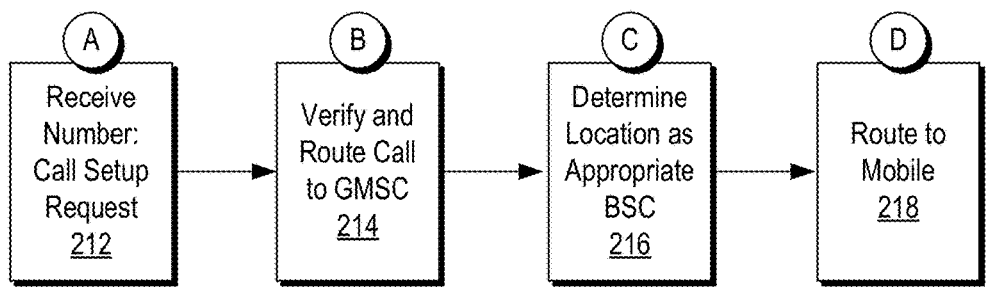

FIG. 2 shows an example of a system 200 and an example of a method 210 that are illustrated with respect to events A, B, C and D and with respect to $P_2$ and $P_N$ of FIG. 1, which may have devices 110-2 and 110-N configured as smart phones, for example, each including a respective subscriber identification module (SIM). A SIM is an integrated circuit that securely stores an international mobile subscriber identity (IMSI) and a related key used to identify and authenticate subscribers on mobile telephony devices (e.g., mobile phones, tablets, computers, etc.). As an example, a SIM may store a number of SMS messages and phone book contacts. For example, such information may be stored in "name and number" pairs. As an example, a policy engine may be implemented in part using a SIM. As an example, a satellite network (e.g., Iridium, Thuraya and Inmarsat's BGAN) may be configured for use with SIMs and may be operable in a Global System for Mobile Communications (GSM) enabled device and may allow a GSM customer to roam in one or more satellite networks via use of the SIM in a satellite network enabled device.

In the example of FIG. 2, a BSC is a base station controller, a VLR is a visitor location register, a HLR is a home location register, a MSC is a mobile switching center, a SMSC is a short message switching center, a GMSC is a gateway mobile switching center, a FNR is a flexible number register and an AuC is an authentication center. As shown, the method 210 includes a reception block 212 that receives a number to initiate a call setup request (see "A"), a verification and routing block 214 that verifies and routes a call to the proper GMSC (see "B"), a determination block 216 that determines a location as associated with a proper BSC (see "C"), and a routing block 218 that routes the call to the proper mobile (see "D").

In the system 200, the various VLRs are databases that include information about subscribers roaming within a MSC location area. A VLR can act to minimize the number of queries that MSCs have to make to an HLR, which includes data regarding a cellular network's subscribers. The kind of data (e.g., fields) stored in a VLR may be akin to those stored in an HLR. For example, a VLR may store the international mobile subscriber identity (IMSI) and the mobile subscriber integrated services digital network (MSISDN), the services allowed for a particular IMSI/MSISDN pair, and authentication data, all of which correspond to a particular subscription (e.g., account). When a subscriber moves into an MSC's location area, a corresponding record is updated in the VLR. Subsequently, the subscriber's HLR is automatically informed of the change.

As to the SMSC, it may implement a short message service as a mechanism of delivery of short messages over mobile networks. Such an approach may be a store and forward way of transmitting messages to and from devices with appropriate network interfaces. As an example, a message (e.g., text) from a sending device can be stored in the SMSC which may forward it to a destination device. In such a system, in the case that the recipient is not available, the short message may be stored and sent later. A short message may adhere to a specification, for example, to a character length of 160 characters where such characters may be text (alphanumeric) or binary non-text short messages. As an example, SMS messages may be sent/received simultaneously with voice/data/fax service over a GSM network.

As an example, a policy may operate based at least in part on location information associated with a user having an account. For example, a policy may depend on location of a user of a device, referred to as the policy holder, and/or location of a device of another that desire to transmit information to the user/policy holder. For example, a policy may include a rule that is related to one or more cells of a cellular network. As an example, consider a policy that states "implement this rule if my device is in my home cell" or a policy that states "implement this rule if my device is not in my home cell". Such an example may be a "travel" policy such that stateful notifications occur based at least in part on whether a user's device is in a home cell or a foreign cell. A home cell policy may be more liberal as a foreign cell may indicate vacation or work travel. As an example, a tiered policy may include a location tier that is part of a decision tree in combination with information as to prior transmissions made by a user's device. For example, if I have called user X ten times in the past three days, allow notifications from user X even if I am not in my home cell; whereas, for those that I have not called ten times in the past three days, block their notifications when I am not in my home cell.

Figure 3:
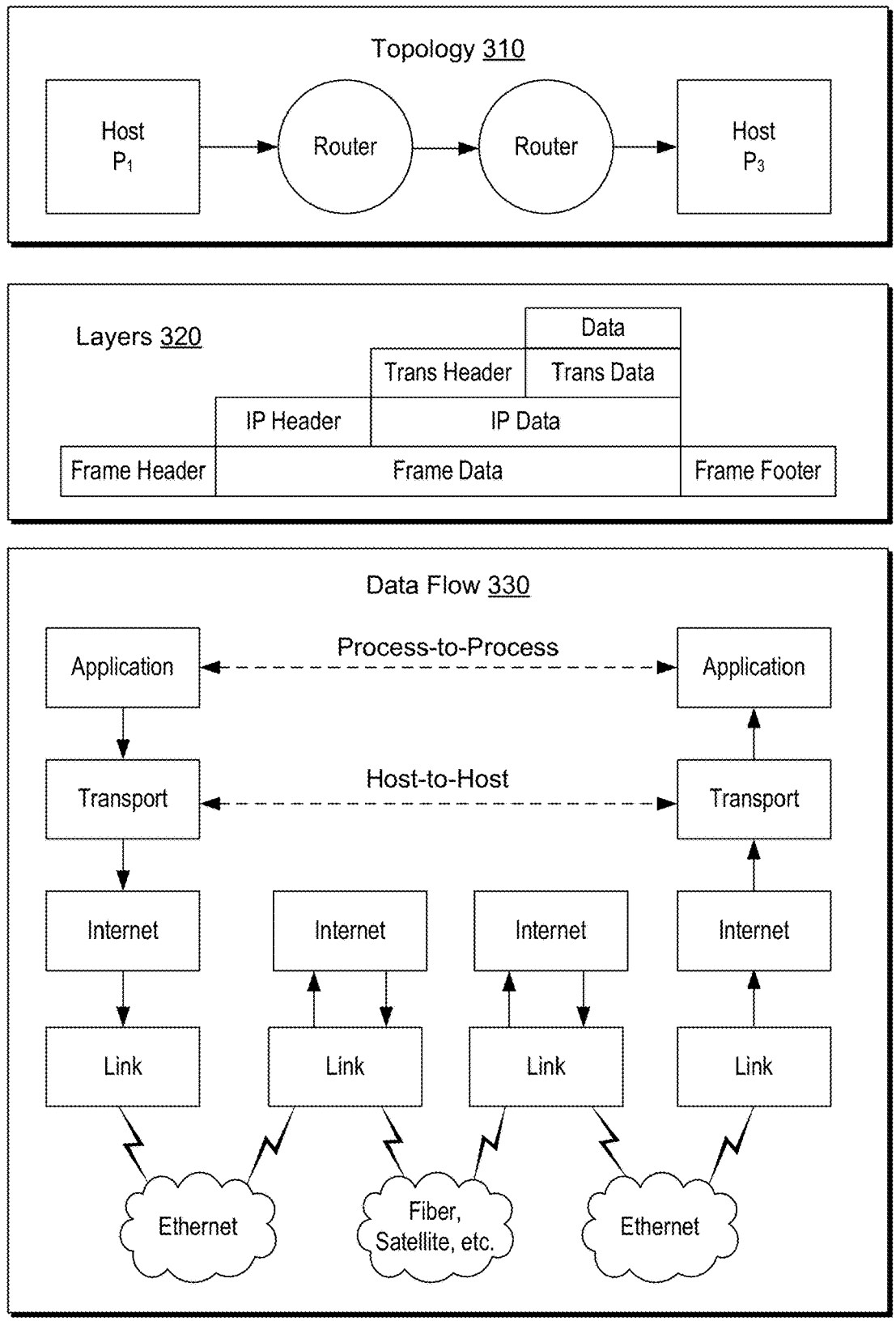
FIG. 3 is a diagram of an example of a topology, an example of a layered model and an example of data flow in a system.

FIG. 3 shows an example of a topology 310, an example of a layered model 320 and an example of a data flow 330. Such examples may be associated with traffic that travels at least in part via the Internet. As shown, the topology includes a host device associated with $P_1$, two routers and a host device associated with $P_3$ where information is transmitted from one host device to the other host device. The two host devices may be the devices 110-1 and 110-3 of the example system 100 of FIG. 1.

In the example of FIG. 3, the hosts may be Internet hosts (e.g., with network interfaces) connected via two routers where corresponding layers are used at each hop. In such an example, an application on each host may execute read and write operations, for example, as if the processes were directly connected to each other by a data pipe. Underlying mechanisms that transmit data between the host devices may be located in lower protocol layers (e.g., below the application layer).

As an example, a transport layer protocol may be the Transmission Control Protocol (TCP). In such an example, the device sending data may operatively connect to a device it is sending the data to and may stay connected for a duration of the data transfer. In such an approach, the two devices can guarantee that the data has arrived safely and correctly and then they may disconnect the connection. Such an approach may be analogous to a phone call that involves a conversation where upon ending the conversation, the connection is released. In another example, a transport layer protocol may be the User Datagram Protocol (UDP). In such an example, a device sending data packages the data into individual packages that can be released into a network with an expectation that it will be directed to an appropriate destination. Such an approach may be analogous to ta postal system.

As to Internet Protocol (IP), which may be appreciated as part of a TCP/IP approach, an Internet layer of a layered model can be responsible for sending packets across one or more networks. Internetworking can involve sending data from a source network to a destination network, which may be referred to as routing. The IP performs host addressing and identification, which may be accomplished via a hierarchical IP addressing system; and packet routing, for example, the task of sending packets of data from a source to a destination by forwarding them to a next network router closer to a desired destination.

As an example, the IPv4 is a connectionless protocol for use on packet-switched networks. It operates on a best effort delivery model in that it does not guarantee delivery nor does it assure proper sequencing or avoidance of duplicate delivery. These aspects, including data integrity, may be addressed by an upper layer transport protocol, such as the Transmission Control Protocol (TCP) (e.g., which is a lower layer to the application layer).

As an example, hosts on the Internet may be known by names, e.g., www.XYZ.com, rather than their IP address, which are used for routing and network interface identification. Use of domain names includes translating (e.g., resolving) to addresses and vice versa. Translation between addresses and domain names may be performed by the Domain Name System (DNS), a hierarchical, distributed naming system which allows for subdelegation of name spaces to other DNS servers.

As discussed above with respect to FIG. 2 and FIG. 3, a user's device may be identifiable on a network via one or more pieces of identifier information. As an example, a transmission may include heterogeneous network transmission such that information transmitted includes information sufficient to route the transmission on more than one type of network. For example, consider a device that includes digital cellular network interface that can connect to a BSC where the BSC may route information (e.g., directly and/or indirectly) to the Internet. In such an example, a user may send an email that travels first via the digital cellular network and then via the Internet. Where an end user/destination device is coupled to a digital cellular network, the transmission may travel from the Internet to the digital cellular network. In such an example, information associated with the transmission may include TCP/IP information. For example, consider an IP address, an email name, etc.

As an example, a method may include parsing information received via a network interface. In such an example, parsed information may reveal identifier information associated with one or more accounts of a sender. Such information may be compared to stored information and, where a match exists, a decision may be made to issue a notification or, for example, to withhold a notification or take one or more other actions (e.g., prompt, blacklist, whitelist, etc.).

Figure 4:
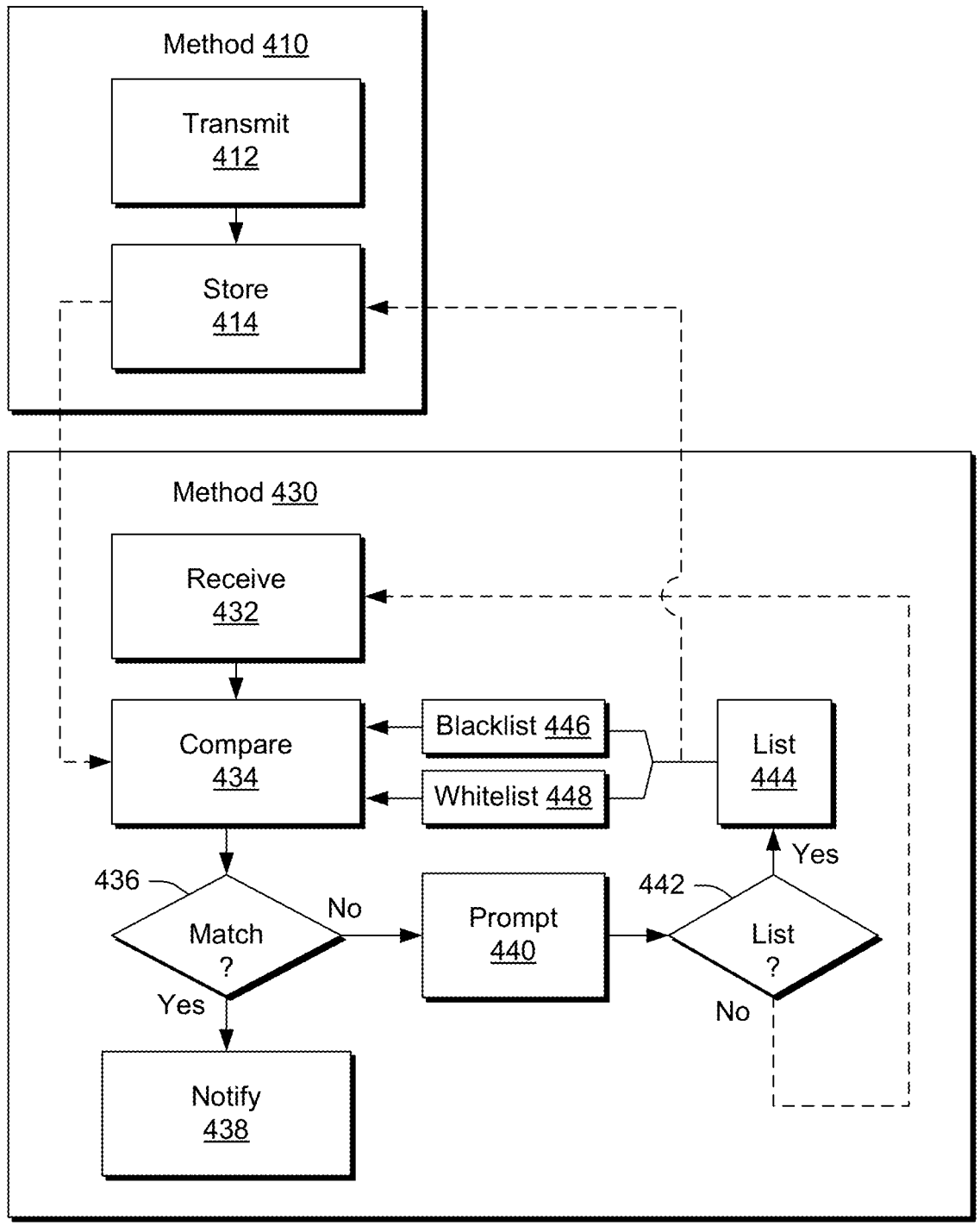
FIG. 4 is a diagram of examples of methods.

FIG. 4 shows an example of a method 410 and an example of a method 430. The method 410 includes a transmission block 412 for transmitting information to a recipient using identifier information and a storage block 414 for storing at least a portion of the identifier information or, for example, indexing a counter that counts a number of transmissions to the intended recipient, optionally within a time frame (e.g., a duration). The method 430 includes a reception block 432 for receiving a transmission from a sender along with identifier information of the sender, comparing at least a portion of the identifier information to stored information (e.g., per the block 414 and/or a blacklist block 446 and/or a whitelist block 448) and, in a decision block 436, deciding if a match occurs (e.g., according to one or more criteria). In the example method 430 of FIG. 4, where a match occurs, the method 430 can continue at a notification block 438 for issuing a notification, for example, by activating notification circuitry of a device as the receiver of the block 432. However, if the decision block 436 decides that a match does not occur (e.g., according to one or more criteria), the method 430 can continue in a prompt block 440 for issuing a prompt, which may be, for example, a user interface with one or more control options. As an example, a control option may be list option that allows a user to store at least a portion of the identifier information of the sender to memory. As shown in the example method 430, a decision block 442 for deciding whether to list identifier information includes a "yes" branch that continues at a list block 444 for storing at least a portion of the identifier information to a blacklist per the blacklist block 446 or to a whitelist per the whitelist block 448. The decision block 442 also includes a "no" branch where, for example, the method 430 may return to a wait block or other block such that the method 430 may recommence in response to receipt of another transmission.

In the example methods 410 and 430 of FIG. 4, transmission of information and receipt of transmitted information may build a database of identifier information for a variety of individuals. Such a database may include a whitelist, a blacklist and/or other type of list. As an example, a policy engine may access such a database to make policy-based decisions, including decisions as to issuance of notifications. As an example, a method may include a reset option that allows for resetting a database, a list, etc.

As an example, a method may be implemented in an account-based in that it allows for multiple users of a device where upon logon an appropriate database is selected that corresponds to logon credentials of a user.

As an example, a method may be implemented in a group manner where, for example, blacklisting of identifier information is applied to members of a group. In such an example, consider a family that includes one or more adults and one or more children where actions of an adult can determine policy or policies for one or more children.

Figure 5:
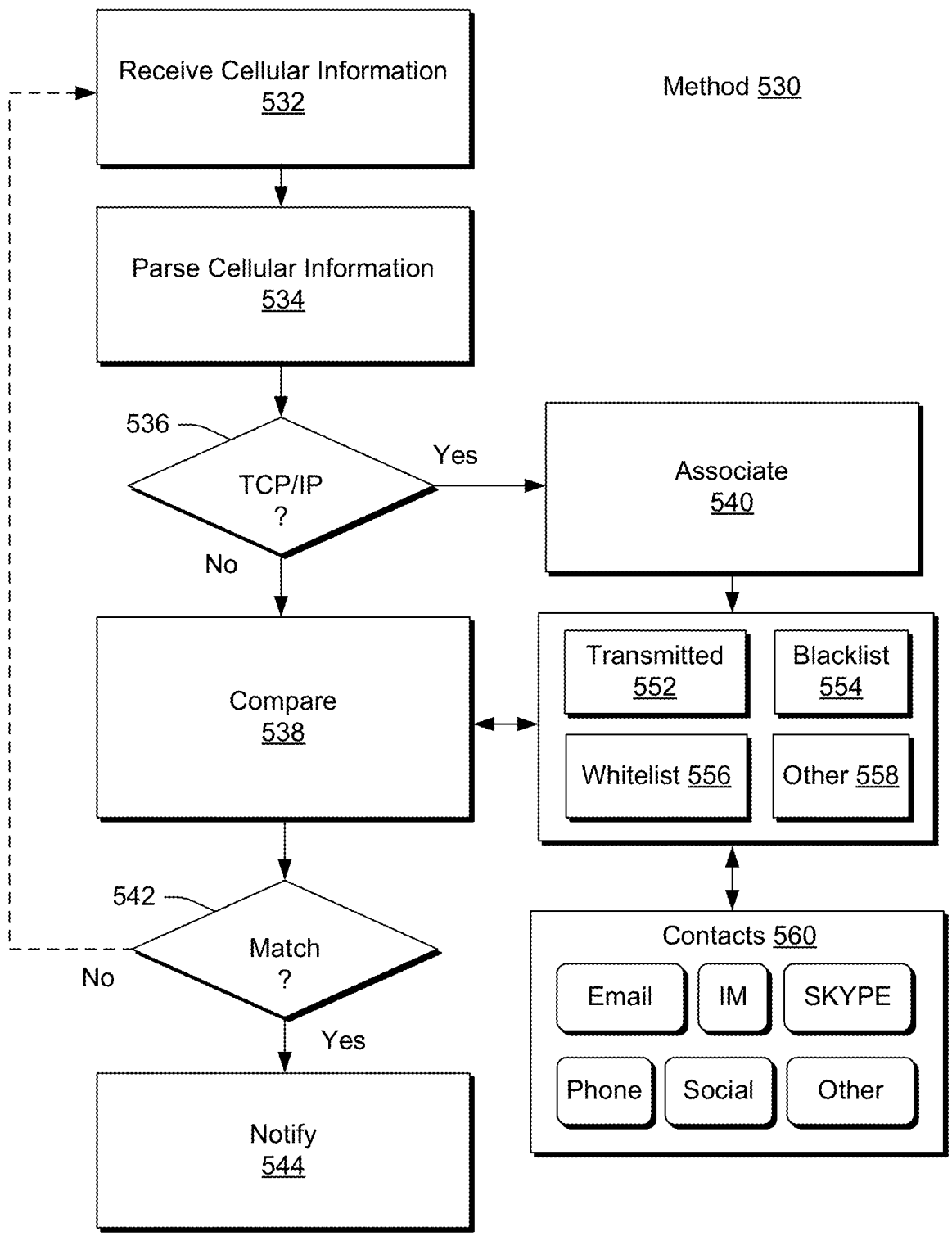
FIG. 5 is a diagram of an example of a method.

FIG. 5 shows an example of a method 530 that includes a reception block 532 for receiving cellular information (e.g., via a digital cellular network), a parse block 534 for parsing cellular information, a decision block 536 for deciding whether TCP/IP information is included in the received information as parsed, a comparison block 538 for comparing at least a portion of the received information to stored information, a decision block 542 for deciding whether a match exists and a notification block 544 for notifying a user (e.g., activating notification circuitry) as to the existence of a match.

Referring to the decision block 536, where TCP/IP information exists, the method 530 may continue in an association block 540 that may associate the information, for example, identifier information, with stored information. Such stored information may be, for example, transmitted information 552, blacklisted information 554, whitelisted information 556 and/or other information 558. As an example, contact information 560 may store identifier information for contacts of a user of a device or devices. As an example, contact information may include identifier information for one or more email contacts, one or more instant messaging contacts, one or more SKYPE® application contacts, one or more phone contacts, one or more social media/network contacts, and/or other types of contacts. As indicated in the example method 530 of FIG. 5, various stored information may be used by the comparison block 538 when making a comparison using received information.

As an example, a method may operate for one or more types of networks. For example, a method may operate responsive to information received via one or more of a WiFi network, the Internet, a digital cellular network, etc. As an example, a method may operate for wired and/or wireless transmissions. As an example, a method may operate for a plurality of types of wireless transmissions (e.g., WiFi technology transmissions, cellular technology transmissions, Bluetooth® technology transmissions, etc.). As an example, a database may include fields for information for one or more types of transmission technologies. As an example, a relational database may provide for cross-referencing of identifier information for one or more types of transmission technologies, for example, for operation in conjunction with policy engine circuitry. As an example, identifier information may be for a person that has an account (e.g., an account number, a name, etc.), for a device that can connect to a network, etc. As to a device, consider a Bluetooth® technology enabled device (e.g., a device ID), a cellular technology enabled device (e.g., a device ID), an Internet enabled device (e.g., a device ID), etc.

Figure 6:
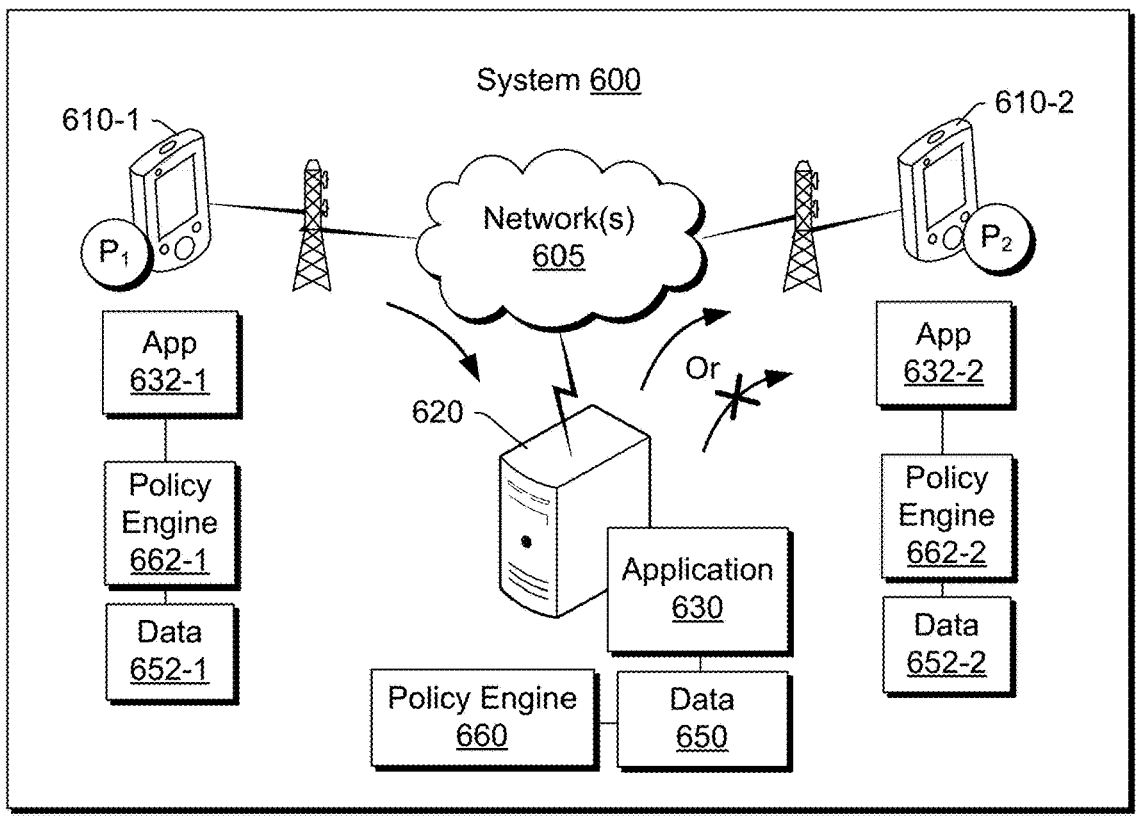
FIG. 6 is a diagram of an example of a system and an example of a graphical user interface.
Figure 6:
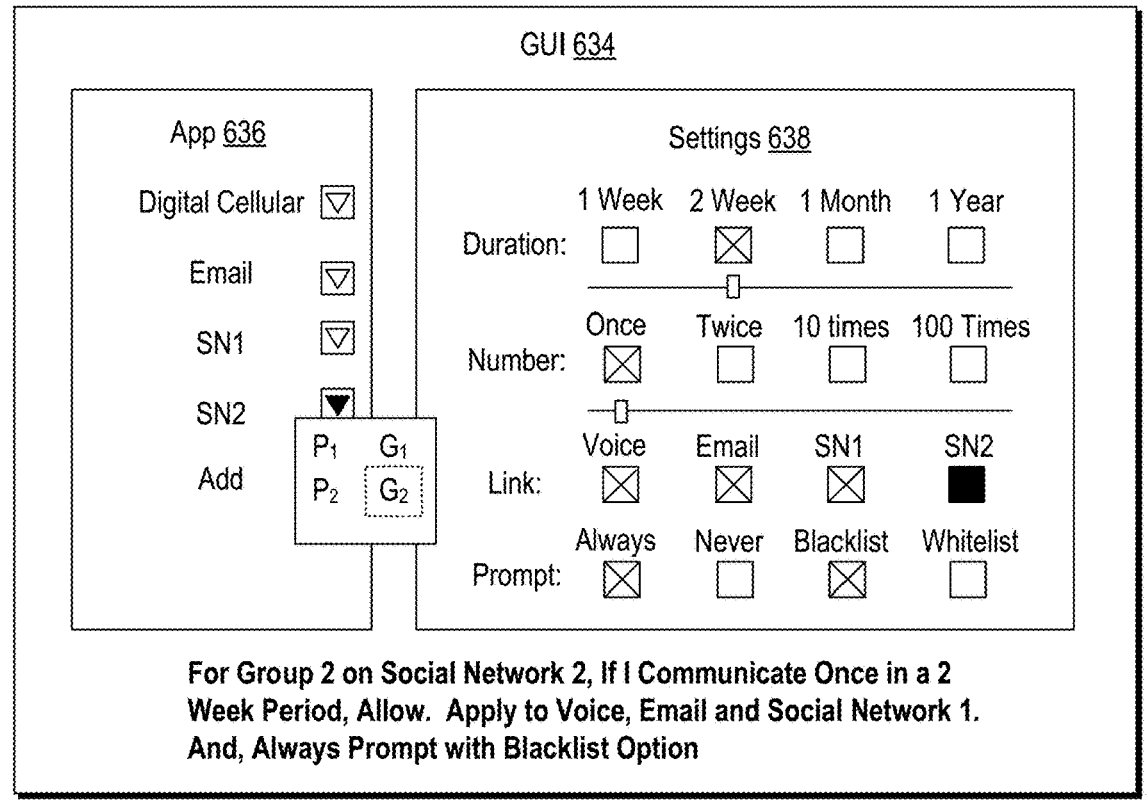

FIG. 6 shows an example of a system 600 that includes one or more networks 605, a device 610-1, a device 610-2 and a device 620. As shown, the device 620 may operate an application 630 that can store and access data 650 and operate a policy engine 660. In the example of FIG. 6, the policy engine 660 may be considered "remote" with respect to the devices 610-1 and 610-2, which may include associated applications 632-1 and 632-2. In such an example, the remote policy engine 660 may make policy decisions for the devices 610-1 and 610-2, for example, as indicated by arrows and an "or" to either forward or not forward a transmission from the device 610-1 to the device 610-2.

As an example, the application 630 may be a social networking application that can store information and implement policies for a plurality of user (e.g., account holders). In such an example, the applications 632-1 and 632-2 may be locally installed applications that may include functionality for transmission of information via one or more types of networks. As an example, an application may include functionality for transmission of information via the Internet where a device includes circuitry that can transmit that information via the Internet and/or via a digital cellular network. As an example, information may be transmitted via a digital cellular network to the Internet and optionally again via a digital cellular network. In such an example, the Internet leg may be directed to one or more servers (e.g., consider the device 620) that may be able to access information for purposes of making policy decisions.

Additionally or alternatively, one or more of the devices 610-1 and 610-2 may include local data 652-1 and 652-2 and/or local policy engines 662-1 and 662-2. As an example, a transmission may be subject to one or more policy engines, which may be local and/or remote.

FIG. 6 also shows an example of a graphical user interface (GUI) 634 that may include application controls 636 and settings controls 638. As an example, a GUI may be rendered to a display of a device at least in part via execution of instructions by a processor of the device where such instructions may be stored in memory of the device. One or more controls of a GUI may be selectable such that upon receipt of a selection signal associated with a control, the control acts to instruct an application, an OS, etc. to perform one or more actions.

As an example, a user may interact with the GUI 634 to select an application and to optionally select members or groups associated with an application. As an example, a user may select one or more settings that are applied by a policy engine. For example, consider a duration setting, a number setting, a link setting and a prompt setting. As shown, a duration setting and/or a number setting may include a slider control that can be adjusted as to length of duration or number of transmissions, respectively. As shown, a link setting may be able to link policy or policies across multiple applications. As shown, a prompt setting may provide for prompting behavior such as always prompt, never prompt, prompt with blacklist, prompt with whitelist, etc. (see, e.g., the method 530 of FIG. 5).

In the example GUI 634, a field may provide for an explanation of a policy or policies. For example, given the selections illustrated, the GUI 634 may describe a policy as follows: "For Group 2 on Social Network 2, If I Communicate Once in a 2 Week Period, Allow. Apply to Voice, Email and Social Network 1. And, Always Prompt with Blacklist Option." In such an example, a user may readily discern the implications of selections made. In other words, logical selections may be translated into one or more phrases that can be understood in addition to the logical selections, for example, as a sanity check. Such an approach can allow a user to double check settings to, for example, reduce errors and help ensure that particular individuals, devices, etc. are treated in a desired manner by a policy engine.

Figure 7:
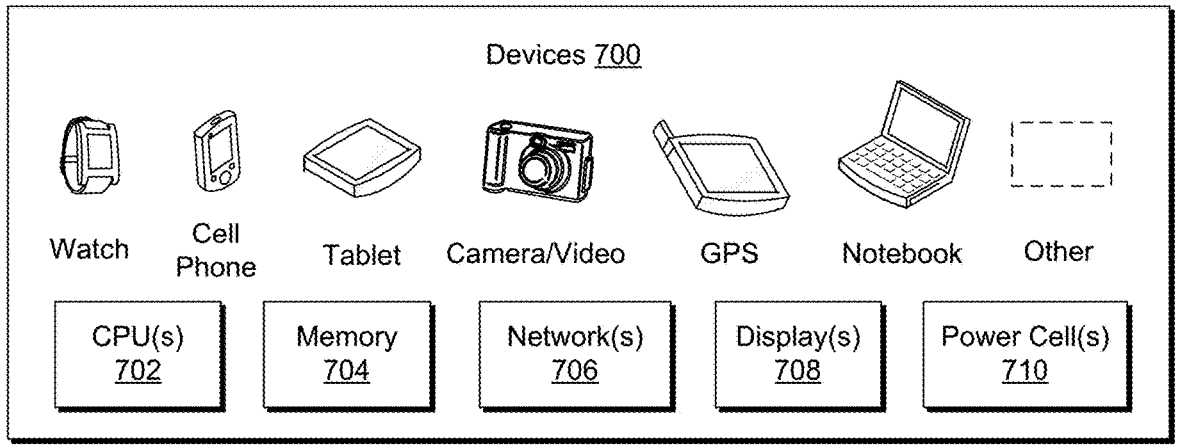
FIG. 7 is a diagram of examples of devices, an example of a hybrid notification scheme and examples of graphical user interfaces.
Figure 7:
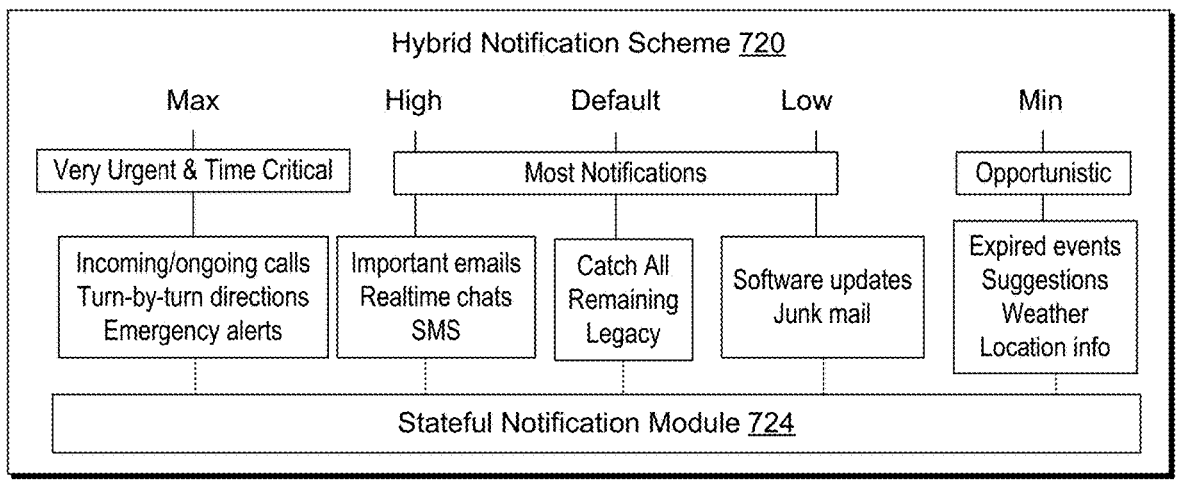
Figure 7:
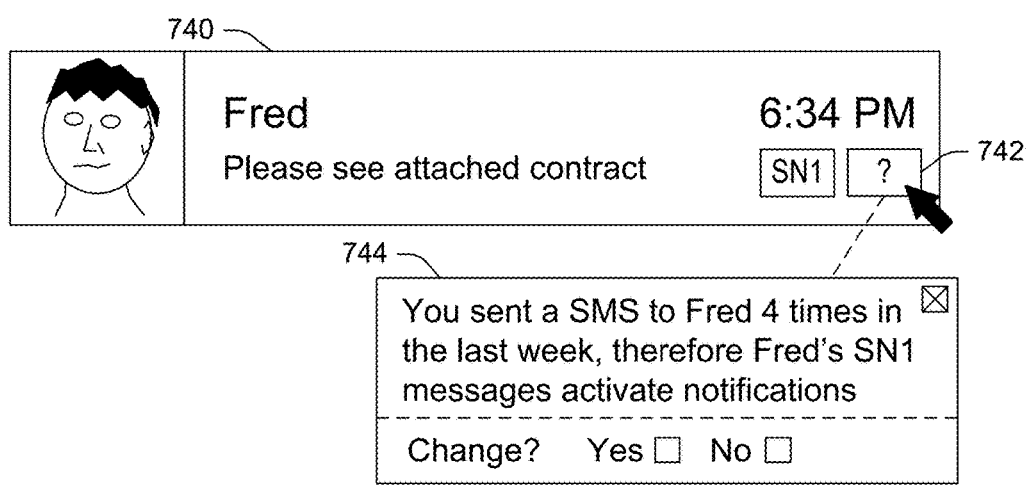

FIG. 7 shows examples of devices 700, which may be configured as a watch, a phone, a tablet, a notebook, a desktop system, a camera, a GPS device or other device. As an example, the devices 700 may include one or more processors 702, memory 704, one or more network interfaces 706, one or more displays 708, and one or more power cells 710. Such devices may include notification circuitry and may include policy engine circuitry.

As an example, a device may include instructions stored in memory that are executable to establish an operating system environment. For example, consider the Android® operating system (e.g., Jelly Bean implementations, etc.), which is based on a Linux® kernel and can provide for user interface based input and display of information. While the Android® OS is mentioned, an iOS® (Apple Inc., Cupertino, Calif.), a WINDOW® OS (Microsoft Corp, Redmond, Wash.), etc. As an example, an operating system may include features for touchscreen mobile devices such as smartphones and tablet computers. As an example, touch inputs may include actions like swiping, tapping, pinching, and reverse pinching to manipulate on-screen objects, a virtual keyboard, etc.

As an example, an OS may provide for notifications. For example, a notification system may allow an app to keep a user informed about events, such as new chat messages or a calendar event. A notification may be a user interface element that may be rendered to a display, for example, outside of an app's normal UI (e.g., to indicate that an event has occurred).

FIG. 7 shows an example of a hybrid notification scheme 720, which includes a stateful notification module 724. Such a scheme may be provided in part via an OS and in part via a stateful notification module, which may operate at an OS level, a sub-OS level, etc. As an example, a stateful notification module may operate in conjunction with one or more network interfaces, for example, at a firmware level of a network interface.

FIG. 7 shows an example of a hybrid notification 740 that includes, for example, an image of a sender, at least a portion of a message, a time of sending, an icon that indicates an associated platform such as a social network application, an email application, voice, SMS, etc. The hybrid notification 740 can include, for example, an icon 742 that may be activated via receipt of user input, which may be touch input, pointing tool input, etc. In the example of FIG. 7, upon activation of the icon 742, a pane 744 may appear that includes policy information as associated with the notification 740. For example, the pane 744 may display policy information that indicates why the notification appeared. In the example of FIG. 7, as the user sent a SMS to Fred 4 times in the last week, the policy determined that Fred's message via SN1 will activate notifications (e.g., notification circuitry). As an example, the pane 744 or other GUI tool may be available for a user to modify the policy. For example, the pane 744 shows change options including a "yes" control box and a "no" control box. Upon selection of "yes", a device may render a GUI such as the GUI 634 to a display of the device where a user may change one or more settings that can affect policy decision making.

As an example, a user may compare a policy statement associated with a notification to a policy associated with settings and/or an explanation of a policy. Such an approach may assist a user with assurance that one or more policies are set as desired, for example, to reduce risk of implementation of an undesired policy or policies.

As an example, an apparatus can include a processor; memory operatively coupled to the processor where the memory stores identifier information; a network interface; notification circuitry; and policy engine circuitry that, responsive to receipt of identifier information via the network interface, activates the notification circuitry if, according to a match criterion, a match exists between at least a portion of the received identifier information and at least a portion of identifier information previously transmitted via the network interface and stored in the memory. In such an example, the network interface can be or include a wireless network interface, for example, consider one or more of a cellular wireless network interface, a WiFi interface, etc. As an example, identifier information may be or include a voice number (e.g., per a SIM, per a SKYPE® account, etc.).

As an example, policy engine circuitry may be configured to delete identifier information from memory based at least in part on a time criterion. For example, a rolling window may be applied of a particular duration where information that has a time prior to the rolling window is deleted. Such a window may be a duration and optionally set via a setting control (see, e.g., the GUI 634) and/or may be set as a default.

As an example, for policy decisions, received identifier information may be associated with a voice transmission and previously transmitted identifier information may be associated with a media transmission. As an example, for policy decisions, received identifier information may be associated with a media transmission and previously transmitted identifier information may be associated with a voice transmission. As an example, for policy decisions, received identifier information may be associated with a voice transmission and previously transmitted identifier information may be associated with a voice transmission. As an example, for policy decisions, received identifier information may be associated with a media transmission and previously transmitted identifier information may be associated with a media transmission.

As an example, for policy decisions, received identifier information or previously transmitted identifier information may be associated with a media transmission where a media transmission can be a text medium, an image medium or a video medium As an example, memory of a device may include a blacklist, a whitelist or a blacklist and a whitelist.

As an example, responsive to transmission of identifier information via a network interface, policy engine circuitry may store at least a portion of the identifier information in the memory.

As an example, policy engine circuitry may include counter circuitry that can count a number of transmissions via a network interface as associated with identifier information of a unique identity and may store the number in memory with the identifier information of the unique identity. In such an example, the policy engine circuitry can include a count criterion that is applied in addition to the match criterion (see, e.g., the "number" setting of the GUI 634).

As an example, policy engine circuitry may parse information formatted according to TCP/IP to obtain TCP/IP identifier information. In such an example, the policy engine circuitry may associate TCP/IP identifier information and digital cellular network identifier information. As an example, policy engine circuitry, responsive to receipt of information formatted according to TCP/IP, may activate notification circuitry if, according to an association criterion, an association exists between at least a portion of TCP/IP identifier information in information formatted according to TCP/IP and at least a portion of digital cellular network interface identifier information previously transmitted and stored in memory. As an example, policy engine circuitry, responsive to receipt of digital cellular network identifier information, may activate notification circuitry if, according to an association criterion, an association exists between at least a portion of received digital cellular network identifier information and at least a portion of TCP/IP identifier information previously transmitted and stored in memory.

As an example, a method can include storing a whitelist of identifier information in memory; receiving identifier information via a network interface; comparing at least a portion of the received identifier information to at least a portion of the stored whitelist of identifier information; based at least in part on the comparing, determining if a match exists according to at least one match criterion; and, if a match does exist, issuing a notification; or, if a match does not exist, issuing a prompt for storing at least a portion of the received identifier information to a blacklist in memory.

As an example, one or more machine-readable storage media can include processor-executable instructions executable to instruct an information handling machine to: store a whitelist of identifier information in memory; receive identifier information via a network interface; compare at least a portion of the received identifier information to at least a portion of the stored whitelist of identifier information; based at least in part on the comparison, determine if a match exists according to at least one match criterion; and, if a match does exist, issue a notification; or, if a match does not exist, issue a prompt to store at least a portion of the received identifier information to a blacklist in memory.

As described herein, various acts, steps, etc., may be implemented as instructions stored in one or more computer-readable storage media. For example, one or more computer-readable storage media can include computer-executable (e.g., processor-executable) instructions to instruct a device. A computer-readable medium may be a computer-readable medium that is not a carrier wave.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium.

Figure 8:
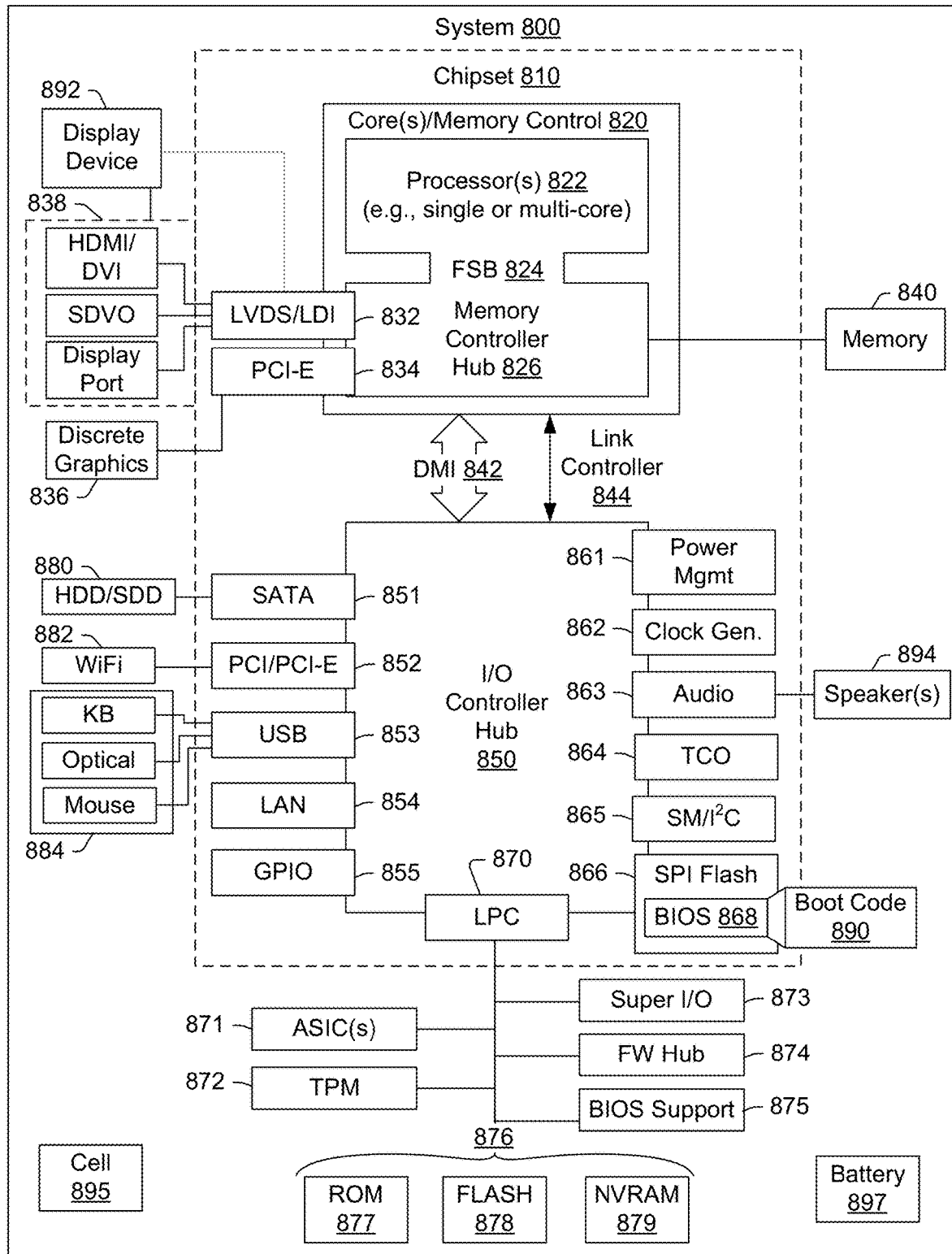
FIG. 8 is a diagram of an example of a system.

While various examples of circuits or circuitry have been discussed, FIG. 8 depicts a block diagram of an illustrative computer system 800. The system 800 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 800. As an example, a device such as one of the devices of FIG. 7 may include at least some of the features of the system 800.

As shown in FIG. 8, the system 800 includes a so-called chipset 810. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 8, the chipset 810 has a particular architecture, which may vary to some extent depending on brand or manufacturer. The architecture of the chipset 810 includes a core and memory control group 820 and an I/O controller hub 850 that exchange information (e.g., data, signals, commands, etc.) via, for example, a direct management interface or direct media interface (DMI) 842 or a link controller 844. In the example of FIG. 8, the DMI 842 is a chip-to-chip interface (sometimes referred to as being a link between a "northbridge" and a "southbridge").

The core and memory control group 820 include one or more processors 822 (e.g., single core or multi-core) and a memory controller hub 826 that exchange information via a front side bus (FSB) 824. As described herein, various components of the core and memory control group 820 may be integrated onto a single processor die, for example, to make a chip that supplants the conventional "northbridge" style architecture.

The memory controller hub 826 interfaces with memory 840. For example, the memory controller hub 826 may provide support for DDR SDRAM memory (e.g., DDR, DDR2, DDR3, etc.). In general, the memory 840 is a type of random-access memory (RAM). It is often referred to as "system memory".

The memory controller hub 826 further includes a low-voltage differential signaling interface (LVDS) 832. The LVDS 832 may be a so-called LVDS Display Interface (LDI) for support of a display device 892 (e.g., a CRT, a flat panel, a projector, etc.). A block 838 includes some examples of technologies that may be supported via the LVDS interface 832 (e.g., serial digital video, HDMI/DVI, display port). The memory controller hub 826 also includes one or more PCI-express interfaces (PCI-E) 834, for example, for support of discrete graphics 836. Discrete graphics using a PCI-E interface has become an alternative approach to an accelerated graphics port (AGP). For example, the memory controller hub 826 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 850 includes a variety of interfaces. The example of FIG. 8 includes a SATA interface 851, one or more PCI-E interfaces 852 (optionally one or more legacy PCI interfaces), one or more USB interfaces 853, a LAN interface 854 (more generally a network interface), a general purpose I/O interface (GPIO) 855, a low-pin count (LPC) interface 870, a power management interface 861, a clock generator interface 862, an audio interface 863 (e.g., for speakers 894), a total cost of operation (TCO) interface 864, a system management bus interface (e.g., a multi-master serial computer bus interface) 865, and a serial peripheral flash memory/controller interface (SPI Flash) 866, which, in the example of FIG. 8, includes BIOS 868 and boot code 890. With respect to network connections, the I/O hub controller 850 may include integrated gigabit Ethernet controller lines multiplexed with a PCI-E interface port. Other network features may operate independent of a PCI-E interface.

The interfaces of the I/O hub controller 850 provide for communication with various devices, networks, etc. For example, the SATA interface 851 provides for reading, writing or reading and writing information on one or more drives 880 such as HDDs, SDDs or a combination thereof. The I/O hub controller 850 may also include an advanced host controller interface (AHCI) to support one or more drives 880. The PCI-E interface 852 allows for wireless connections 882 to devices, networks, etc. The USB interface 853 provides for input devices 884 such as keyboards (KB), one or more optical sensors, mice and various other devices (e.g., microphones, cameras, phones, storage, media players, etc.). On or more other types of sensors may optionally rely on the USB interface 853 or another interface (e.g., I²C, etc.). As to microphones, the system 800 of FIG. 8 may include hardware (e.g., audio card) appropriately configured for receipt of sound (e.g., user voice, ambient sound, etc.).

In the example of FIG. 8, the LPC interface 870 provides for use of one or more ASICs 871, a trusted platform module (TPM) 872, a super I/O 873, a firmware hub 874, BIOS support 875 as well as various types of memory 876 such as ROM 877, Flash 878, and non-volatile RAM (NVRAM) 879. With respect to the TPM 872, this module may be in the form of a chip that can be used to authenticate software and hardware devices. For example, a TPM may be capable of performing platform authentication and may be used to verify that a system seeking access is the expected system.

The system 800, upon power on, may be configured to execute boot code 890 for the BIOS 868, as stored within the SPI Flash 866, and thereafter processes data under the control of one or more operating systems and application software (e.g., stored in system memory 840). An operating system may be stored in any of a variety of locations and accessed, for example, according to instructions of the BIOS 868. Again, as described herein, a satellite, a base, a server or other machine may include fewer or more features than shown in the system 800 of FIG. 8. Further, the system 800 of FIG. 8 is shown as optionally include cell phone circuitry 895, which may include GSM, CDMA, etc., types of circuitry configured for coordinated operation with one or more of the other features of the system 800. Also shown in FIG. 8 is battery circuitry 897, which may provide one or more battery, power, etc., associated features (e.g., optionally to instruct one or more other components of the system 800). As an example, a SMBus may be operable via a LPC (see, e.g., the LPC interface 870), via an I²C interface (see, e.g., the SM/I²C interface 865), etc.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. An apparatus comprising:
   a processor;
   memory operatively coupled to the processor wherein the memory stores identifier information for a variety of individuals;
   a network interface operatively coupled to the processor, wherein the network interface comprises a wireless network interface;
   a display operatively coupled to the processor;
   notification circuitry operatively coupled to the processor; and
   policy engine circuitry operatively coupled to the processor that, responsive to receipt of identifier information for an individual via the network interface, activates the notification circuitry if, according to a match criterion, a match exists between at least a portion of the received identifier information and at least a portion of identifier information previously transmitted via the network interface and stored in the memory.

2. The apparatus of claim 1 wherein the network interface comprises a cellular wireless network interface.

3. The apparatus of claim 1 wherein the identifier information comprises a voice number.

4. The apparatus of claim 1 wherein the policy engine circuitry deletes identifier information from the memory based at least in part on a time criterion.

5. The apparatus of claim 1 wherein the received identifier information is associated with a voice transmission and wherein the previously transmitted identifier information is associated with a media transmission.

6. The apparatus of claim 1 wherein the received identifier information is associated with a media transmission and wherein the previously transmitted identifier information is associated with a voice transmission.

7. The apparatus of claim 1 wherein the received identifier information is associated with a voice transmission and wherein the previously transmitted identifier information is associated with a voice transmission.

8. The apparatus of claim 1 wherein the received identifier information is associated with a media transmission and wherein the previously transmitted identifier information is associated with a media transmission.

9. The apparatus of claim 1 wherein the received identifier information or the previously transmitted identifier information is associated with a media transmission wherein a media transmission comprises a text medium, an image medium or a video medium.

10. The apparatus of claim 1 wherein the memory comprises a blacklist, a whitelist or a blacklist and a whitelist.

11. The apparatus of claim 1 wherein, responsive to transmission of identifier information via the network interface, the policy engine circuitry stores at least a portion of the identifier information in the memory.

12. The apparatus of claim 1 wherein the policy engine circuitry comprises counter circuitry that counts a number of transmissions via the network interface as associated with identifier information of a unique identity and that stores the number in the memory with the identifier information of the unique identity.

13. The apparatus of claim 12 wherein the policy engine circuitry comprises a count criterion that is applied in addition to the match criterion.

14. The apparatus of claim 1 wherein the policy engine circuitry parses information formatted according to TCP/IP to obtain TCP/IP identifier information.

15. The apparatus of claim 14 wherein the policy engine circuitry associates TCP/IP identifier information and digital cellular network identifier information.

16. The apparatus of claim 15 wherein the policy engine circuitry, responsive to receipt of information formatted according to TCP/IP, activates the notification circuitry if, according to an association criterion, an association exists between at least a portion of TCP/IP identifier information in the information formatted according to TCP/IP and at least a portion of digital cellular network interface identifier information previously transmitted and stored in the memory.

17. The apparatus of claim 15 wherein the policy engine circuitry, responsive to receipt of digital cellular network identifier information, activates the notification circuitry if, according to an association criterion, an association exists between at least a portion of the received digital cellular network identifier information and at least a portion of TCP/IP identifier information previously transmitted and stored in the memory.

18. A method comprising:
storing a whitelist of identifier information for a variety of individuals in memory of a device;
receiving identifier information for an individual via a network interface of the device;
comparing at least a portion of the received identifier information to at least a portion of the stored whitelist of identifier information;
based at least in part on the comparing, determining if a match exists according to at least one match criterion; and
if a match does exist, issuing a notification via circuitry of the device; or
if a match does not exist, issuing a prompt for storing at least a portion of the received identifier information to a blacklist in memory of the device.

19. One or more non-transitory machine-readable storage media comprising processor-executable instructions executable to instruct an information handling machine to:
store a whitelist of identifier information for a variety of individuals in memory of a device;
receive identifier information for an individual via a network interface of the device;
compare at least a portion of the received identifier information to at least a portion of the stored whitelist of identifier information;
based at least in part on the comparison, determine if a match exists according to at least one match criterion; and
if a match does exist, issue a notification via circuitry of the device; or
if a match does not exist, issue a prompt to store at least a portion of the received identifier information to a blacklist in memory of the device.

20. An apparatus comprising:
a processor;
memory operatively coupled to the processor wherein the memory stores identifier information for a variety of individuals;
a network interface operatively coupled to the processor;
a display operatively coupled to the processor;
notification circuitry operatively coupled to the processor; and
policy engine circuitry operatively coupled to the processor that, responsive to receipt of identifier information for an individual via the network interface, wherein the identifier information comprises a voice number, activates the notification circuitry if, according to a match criterion, a match exists between at least a portion of the received identifier information and at least a portion of identifier information previously transmitted via the network interface and stored in the memory.

* * * * *